(12) United States Patent
Goldman et al.

(10) Patent No.: US 7,395,544 B2
(45) Date of Patent: Jul. 1, 2008

(54) REGULATING THE QUALITY OF A BROADCAST BASED ON MONITORED VIEWING BEHAVIOR INFORMATION

(75) Inventors: Phillip Y. Goldman, Los Altos, CA (US); J. Wiltse Carpenter, San Francisco, CA (US); Steven C. Wasserman, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 923 days.

(21) Appl. No.: 09/820,582

(22) Filed: Mar. 29, 2001

(65) Prior Publication Data

US 2002/0144266 A1 Oct. 3, 2002

(51) Int. Cl.
*H04N 7/16* (2006.01)
*H04N 60/33* (2006.01)
*H04N 7/173* (2006.01)

(52) U.S. Cl. .............................................. 725/9; 725/95
(58) Field of Classification Search .................. 725/95, 725/44–47, 14–21, 35
See application file for complete search history.

(56) References Cited

U.S. PATENT DOCUMENTS

| | | | |
|---|---|---|---|
| 5,592,470 A * | 1/1997 | Rudrapatna et al. | 370/320 |
| 5,600,573 A * | 2/1997 | Hendricks et al. | 725/109 |
| 5,608,899 A | 3/1997 | Li | |
| 5,758,257 A * | 5/1998 | Herz et al. | 725/116 |
| 5,805,203 A * | 9/1998 | Horton | 725/119 |
| 5,974,299 A | 10/1999 | Massetti | |
| 6,154,463 A | 11/2000 | Aggarwal | |
| 6,312,336 B1 | 11/2001 | Handelman | |
| 6,718,552 B1 * | 4/2004 | Goode | 725/95 |
| 6,754,904 B1 | 6/2004 | Cooper | |
| 6,772,195 B1 | 8/2004 | Hatlelid | |

(Continued)

FOREIGN PATENT DOCUMENTS

JP 410248020 A 9/1998

(Continued)

OTHER PUBLICATIONS

U.S. Appl. No. 09/567,474, filed May 8, 2000, Glusker.

(Continued)

*Primary Examiner*—Hunter B. Lonsberry
(74) *Attorney, Agent, or Firm*—Workman Nydegger

(57) ABSTRACT

Systems and methods for utilizing a back channel as a feedback system to regulate the quality of broadcast. A signal source transmits a signal corresponding to the broadcast to one or more home entertainment systems. The displaying, recording or utilization of the broadcast is tracked at the individual home entertainment systems. The tracked information is transmitted in either real time or on a deferred basis from home entertainment systems as feedback across a back channel. The quality of the broadcast is regulated and/or optimized as a result of the feedback. As such, the broadcast can be dynamically restructured by modifying the bandwidth of the broadcast, by changing the modulation of the broadcast, by changing the encoding scheme of the broadcast, by varying parameters of the encoding scheme of the broadcast, by redistributing satellite channels to take full advantage of transponders available in a satellite television system, etc. The feedback also informs the operators and broadcasters as to when a disruption can be made on the broadcast so that the effect of the disruption is minimized.

40 Claims, 6 Drawing Sheets

U.S. PATENT DOCUMENTS

| | | |
|---|---|---|
| 6,774,926 B1 | 8/2004 | Ellis |
| 2001/0049620 A1* | 12/2001 | Blasko .................. 705/10 |
| 2002/0053077 A1 | 5/2002 | Shah-Nazaroff |
| 2002/0095676 A1* | 7/2002 | Knee et al. .................. 725/46 |
| 2002/0112239 A1 | 8/2002 | Goldman |
| 2003/0056208 A1 | 3/2003 | Kamada |
| 2003/0088872 A1 | 5/2003 | Maissel |
| 2003/0115585 A1 | 6/2003 | Barsness |
| 2003/0145323 A1 | 7/2003 | Hendricks |
| 2005/0071882 A1* | 3/2005 | Rodriguez .................. 725/95 |
| 2005/0262542 A1 | 11/2005 | DeWeese |

FOREIGN PATENT DOCUMENTS

| | | |
|---|---|---|
| WO | WO9945700 A1 | 9/1999 |
| WO | WO0027124 A1 | 5/2000 |
| WO | WO0013416 A1 | 9/2000 |

OTHER PUBLICATIONS

Office Action mailed Oct. 5, 2007 cited in related U.S. Appl. No. 09/587,474.

NPL Reference—"Pie Chart" definition from Internet Archive of www.whatis.com (Sep. 2000).

* cited by examiner

REGULATING THE QUALITY OF A BROADCAST BASED ON MONITORED VIEWING BEHAVIOR INFORMATION

BACKGROUND OF THE INVENTION

1. The Field of the Invention

The present invention relates to systems and methods for utilizing a back channel as a feedback system to regulate the quality of a broadcast. More specifically, the present invention is directed to tracking user behavior information at home entertainment systems corresponding to the broadcast, transmitting the tracked information as feedback across a back channel, and modifying the quality of the broadcast as a result of the feedback. While the systems and methods of the present invention are applicable to any broadcast system, they are particularly useful for high volume digital television systems that currently exist worldwide via cable and satellite television.

2. Background and Related Art

Historically, television has been a source of entertainment for the general public and a medium through which an enormous number of individuals can be reached. However, operators of digital television (i.e. cable television, satellite television, etc.) are limited by current transmission capacities and thus seek ways to optimize the available bandwidth. The current method for maximizing the bandwidth includes a broadcast center controlling the amount of bandwidth allocated to each channel according to the likelihood of viewer participation. As a marketing decision, greater portions of the bandwidth and, as a result, greater image quality, are reserved for the channels that are more likely to be watched by the general public. For example, a channel that broadcasts an international soccer match would be allocated less bandwidth in the United States than a channel that broadcasts a professional football game because of the potential to obtain a greater television audience.

Current methods used to gather information on viewer participation are extremely limited as to the amount and type of information that is gathered. By way of example, members of the viewing public are paid by businesses to record in logbooks the television channels they watch during a sample period of time and then mail the logbooks to a central location after the completion of the sample period. At the central location, the information from the logbooks is manually entered into a database. This method limits the amount of data that is gathered because viewers are generally not willing to invest large portions of time to register information in logbooks. Furthermore, inaccuracies are introduced into the gathered data due to the viewers' desires to quickly complete the registering of information and the existence of human error in the manual registering process.

Another method includes installing devices in the homes of viewers to monitor and record the channels tuned during a sample period. Each viewer of a household is assigned a symbol recognizable to the device and is responsible to select the symbol to indicate that he or she is watching the television. From time to time the device flashes a red light to remind the viewers to select their corresponding symbol. The viewing information recorded by the device includes the channels tuned and the viewing date and time. Later, the viewing information is converted into usable data by identifying the corresponding television programs that were scheduled for the identified channel at the recorded viewing date and time.

The conversion process is performed at a central location and inaccuracies result in the converted data when, for example, last minute changes are made in the programming schedule, cable companies place network stations in different places in the channel lineup, programs are aired at different times in different locations, and viewers receive a signal that is broadcast from a different time zone. Moreover, the conversion process can involve a significant amount of data processing because the television programming that is broadcast on a given channel at a specified time can vary from locality to locality. Furthermore, this method relies on a broadcaster encoding each program for detection by the device and is therefore inappropriate for tracking less popular, locally produced, or exclusively cable-based programming.

Bandwidth for video today is a scarce commodity, and therefore expensive. Indeed the great value of using a broadcast medium for video is the greatly lower bandwidth requirement. But viewer demand for higher quality video (e.g., HDTV) and additional applications like video-on-demand ("VOD") and interactive enhancements continues to grow. The lack of meaningful and reliable data as to actual viewer participation forces digital television operators to allocate greater portions of bandwidth based on a likelihood or hunch of where the greater viewer participation will exist. (A broadcast center, such as a cable headend, often supplies the broadcast feeds to as few as a few hundred households.) However, because viewer participation varies from state-to-state, city-to-city, and neighborhood-to-neighborhood, the basis on which bandwidth is allocated is vastly inefficient compared to usage requirements.

SUMMARY OF THE INVENTION

The present invention relates to systems and methods for utilizing a back channel as a feedback system to regulate the quality of a broadcast. More specifically, the present invention is directed to tracking user behavior information at home entertainment systems corresponding to the broadcast, transmitting the tracked information as feedback across a back channel, and modifying the quality of the broadcast as a result of the feedback.

Implementation of the present invention uses a back channel as a feedback system that obtains and reports actual information as to what and how a broadcast is being used. The implementation may take place in association with a set-top box, cable or satellite box, television set, personal computer, or any other device that is included in a home entertainment system and has the processing capabilities to perform the operations disclosed herein. In one implementation, addressable set-top boxes track user behavior information and send the information in real time through the use of a back channel. Alternatively, the user behavior information is periodically uploaded from the set-top boxes to a satellite link.

Improved feedback is obtained through implementation of the present invention. The utilization of a data source, such as an electronic program guide, increases the amount and type of information that can be obtained. The user behavior information is sent in a usable form that is descriptive of the use of the broadcast. Automation and local processing of user behavior information reduce inaccuracies in processing the tracked data. Anonymous reporting of user behavior information avoids privacy concerns.

The improved feedback provides digital television operators and broadcasters, for example, valuable guidance for regulating and optimizing the bandwidth and the quality of a broadcast. By way of example, the broadcasting of channels can be restructured to better utilize available bandwidth by allocating bandwidth according to the actual audience of a broadcast, by allocating increased bandwidth to broadcasts that, for example, enable viewer interaction along with the broadcast, by changing the modulation of the broadcast or the encoding scheme of a broadcast, by varying parameters of the encoding scheme, and/or by redistributing satellite channels to take full advantage of transponders available in a satellite television system. The feedback also informs the operators and broadcasters as to when a disruption that entirely shuts off the broadcast can be most efficiently made on a channel so that the effect of the disruption is minimized on the viewing public.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present invention relates to systems and methods for utilizing a back channel as a feedback system to regulate the quality of a broadcast. More specifically, the present invention is directed to tracking user behavior information at home entertainment systems corresponding to the broadcast, transmitting the tracked information as feedback across a back channel, and modifying the quality of the broadcast as a result of the feedback.

The embodiments of the present invention may comprise a special purpose or general purpose computer including various computer hardware, as will be discussed in greater detail below. Set top boxes that enhance the capabilities of conventional televisions represent an example of a special purpose computer. Examples of a general purpose computer include a personal computer, a laptop computer, and any other such computer capable of sending feedback across a back channel.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computerreadable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Exemplary Operating Environment

Figure 1:
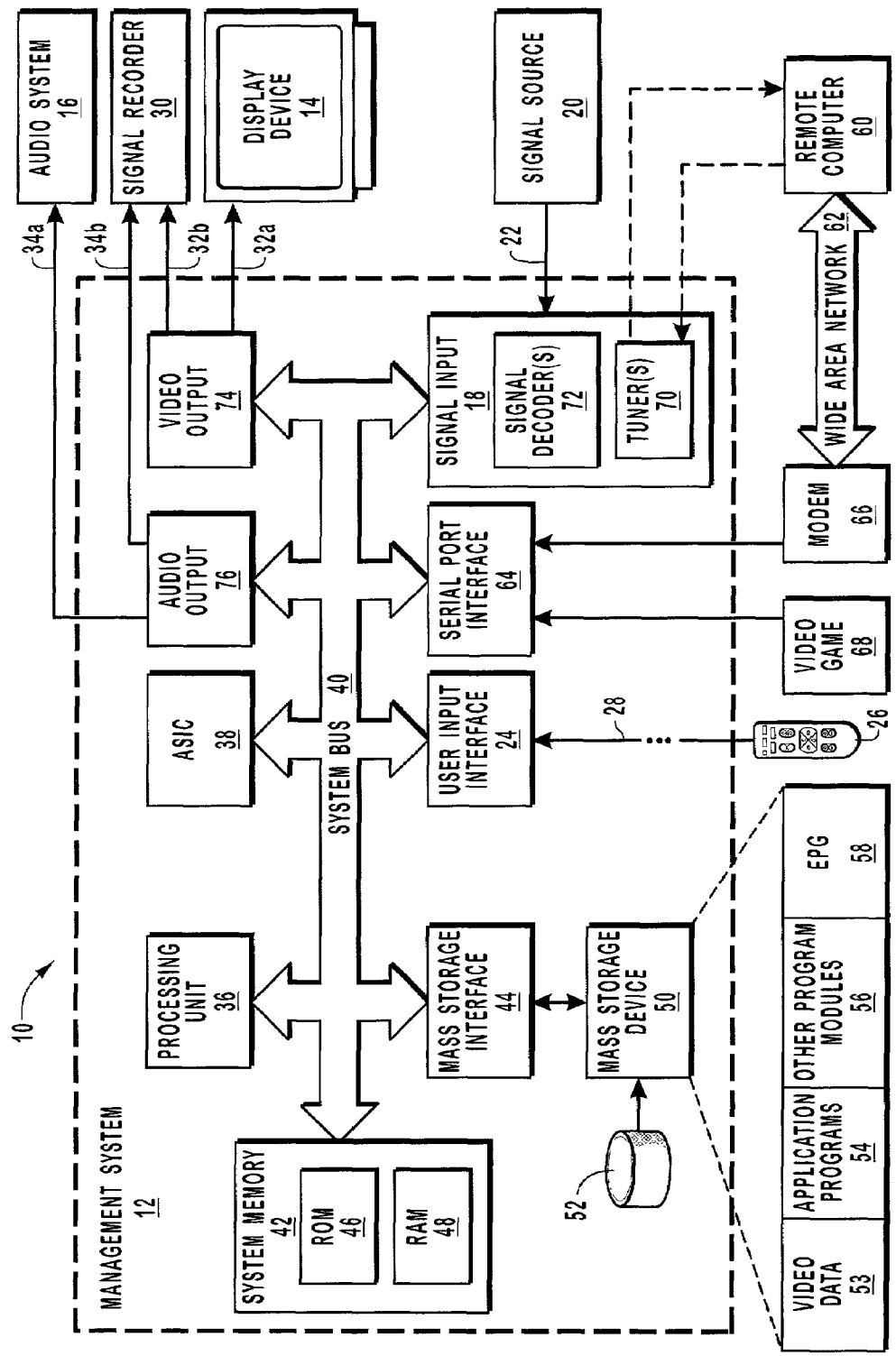
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by set-top boxes or other computers in network environments. Generally, program modules include routines, programs, objects, components, data structures, etc., which perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

In the discussion, reference is made to a home entertainment system that may be used for receiving a broadcast. For purposes of this description and in the claims, a "home entertainment system" may comprise an output device, such as a television screen or audio system, coupled to a processing device for performing the data processing steps disclosed herein, or may include any number of interconnected consumer electronic devices, one of which having a processing device for performing the data processing steps disclosed herein. Examples of such consumer electronic devices include a video cassette recorder ("VCR"), a video game system, a stereo system, a television or monitor with data processing capabilities, a cable television box, a digital satellite system receiver ("DSS"), a digital video broadcasting system ("DVB"), a digital versatile disc system ("DVD"), a set-top box that serves as an Internet terminal, and any other device capable of processing data as described herein. Furthermore, the term "home entertainment system" is to be understood as a term that broadly describes a broadcast-receiving environment, whether it is located in a viewer's home, at a place of business, in the public, or at any other location. Also for purposes of this description and in the claims, the term "broadcast" includes viewable portions of moving image data and/or sound data.

In one embodiment, the present invention is implemented in a system that uses a conventional television screen or other display unit to display information and includes a WebTV® set-top box or a similar Internet terminal that has been adapted to perform the operations that include composing, sending and receiving email, browsing the World Wide Web ("Web"), accessing other segments of the Internet, and otherwise displaying information. An Internet terminal typically uses standard telephone lines, Integrated Services Digital Network (ISDN) lines, cable lines associated with cable television service, or the like to connect to the Internet or other wide area networks.

FIG. 1 illustrates a home entertainment system 10 that includes a management system 12, a display device 14 and an audio system 16. Management system 14 may be a set-top box or Internet terminal that has been adapted to perform the operations disclosed herein. Management system 12 may be integrally positioned with or separate from display device 14, which may be a high definition television display, a standard television display, a flat panel display, a projection device, a high definition television display, a computer monitor, or any other device capable of displaying viewable video image data. Audio system 16 may be a speaker, a stereo system, or any device capable of emitting sound data, and similarly may be integrally positioned with or separate from display device 14.

Management system 12 includes a signal input 18, which receives a broadcast from a signal source 20. The broadcast is transmitted from signal source 20 to signal input 18 via an input line 22, which can include a cable or optic connection, a terrestrial antenna system, a satellite system, and/or any device or system capable of transmitting a broadcast to home management system 12.

While FIG. 1 illustrates home entertainment system 10 as having a single input line 22 and a single signal source 20, there can instead be a plurality of input lines that transmit broadcasts from a plurality of signal sources. In such embodiments, the home entertainment system may receive a broadcast from one signal source or from a plurality of signal sources at a time.

Management system 12 also includes a user input interface 24, which receives input from an input device 26, such as a remote control or any other device capable of generating electronic instructions. Input device 26 is communicatively coupled to management system 12 over an input link 28 so as to enable such control. Input device 26 generates electronic instructions over input link 28 in response to preprogrammed data or in response to a viewer pressing buttons on input device 26. Input device 26 may also control Web browser software within management system 12 as when management system 12 is a set-top box or an Internet terminal that has been adapted to perform the operations disclosed herein. For instance, input device 26 may be programmed to turn on home entertainment system 10 and to tune management system 12 to a channel.

FIG. 1 illustrates a signal recorder 30, which is capable of receiving video and/or audio data and recording the data on a storage medium. Video signals may be transmitted to signal recorder 30 and/or display device 14 by video image link 32, examples of which include a radiofrequency ("RF") link, an S-video link, a composite link, or any other equivalent form of video image link. Similarly, audio link 34 may transmit audio data from management system 12 to audio system 16 or to signal recorder 30. Data that represents the displaying, recording and/or utilization of the broadcast at home entertainment system 10 is transmitted as feedback via one or more back channels, as will be further explained below.

The operation of management system 12 is controlled by a central processing unit ("CPU"), illustrated as processing unit 36, which is coupled to an application-specific integrated circuit ("ASIC") 38 and uses computer-executable instructions implemented in software and/or hardwired logic circuitry. Processing unit 36 and ASIC 38 are coupled via a system bus 40, which also interconnects various other system components, such as the system memory 42, mass storage interface 44, user interface 24 and signal input 18. Processing unit 36 executes software designed to implement features of management system 12, including anonymously tracking user behavior information at home entertainment system 10 and transmitting the tracked information as feedback across a back channel. ASIC 38 contains circuitry that is used to implement certain functions of management system 12. Instructions, data, and other software necessary for the operation of processing unit 36 and ASIC 38 may be stored in the system memory 42, such as in read-only memory ("ROM") 46, in random-access memory ("RAM") 48, and/or in a mass storage device 50, which is coupled to mass storage interface 44. ROM 46, RAM 48 and mass storage device 50 are communicatively coupled to ASIC 38 so as to be readable by ASIC 38 and so that data may be written from ASIC 38 to RAM 48 and possibly mass storage device 50.

Mass storage device 50 may be a magnetic hard disk 52 or any other magnetic or optical mass memory device that is capable of storing large amounts of data. Any desired computerreadable instructions or data, including application programs 54, other program modules 56, and a data source, such as an electronic programming guide ("EPG") 58, which specifies broadcast information, can be stored in mass storage device 50. Furthermore, mass storage device 50 can be used to record video data 53, in which case, management system 12 functions as a digital video recorder.

In one embodiment, EPG data is supplied on a regular basis to continually maintain a current schedule of the broadcast at the management system 12, and may be obtained in a variety of manners, including from a remote computer 60 or a signal source 20. Where management system 12 is associated with the Internet, EPG data may be downloaded from the Internet. Alternatively, EPG data may delivered to the home entertainment system by using a direct-dial communication over standard telephone lines, or by using data transmission over the cable television infrastructure, a satellite network, an over-the-air broadcasting or any other available medium.

In the embodiment where management system 12 is associated with the Internet, communication with a remote computer 60 can be performed via a wide area network ("WAN") 62 by including a serial port interface 64 that is interposed between system bus 40 and a modem 66, a wireless link (not show), or other means for establishing communications over a WAN that may be internal or external to management system 12. Management device 12 is also capable of transmitting information via the Internet by utilizing direct-dial communication over standard telephone lines, or by using another available communication medium.

Referring now to signal input 18, if the signal on programming input line 22 includes multiple channels, a tuner 70 included in signal input 18 tunes to a selected channel in the signal. Multiple tuners 70 can be used to provide enhanced viewing features, including picture-inpicture display of programming, recording one channel while viewing another, and recording a plurality of channels simultaneously. In the event that ASIC 38 and tuner 70 employ different formats, a signal decoder 72 converts video data from an analog format to a digital format or from a digital format to an analog format. Video decoder 72 can also decode video data from a compressed video format (e.g. MPEG, etc.). In embodiments where the management system 12 includes multiple tuners 70, management system 12 may also include multiple signal decoders 72. Management system 12 also includes a video output 74 and an audio output 76.

While FIG. 1 and the corresponding discussion above provide a general description of a suitable environment in which the invention may be implemented, it will be appreciated that the features of the present invention disclosed herein may be practiced in association with a variety of different system configurations. And, while the systems and methods of the present invention are applicable to any broadcast system, they are particularly useful for high volume digital television systems that exist worldwide via cable and satellite television.

Tracking User Behavior Information

Figure 2:
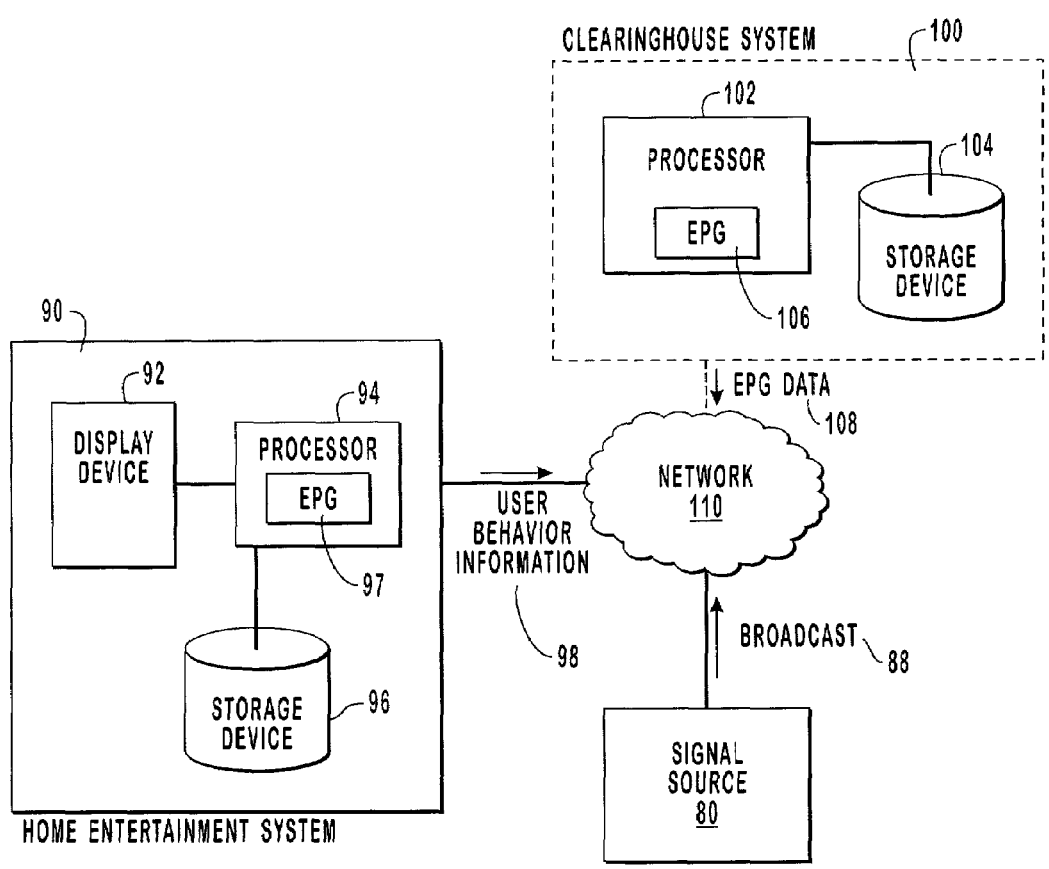
FIG. 2 illustrates an exemplary networked system that allows for tracking information and transmitting the tracked information via a back channel as feedback.

FIG. 2 illustrates an exemplary networked system that receives a broadcast from a signal source that is output, for example, on a display device of a home entertainment system. The system tracks viewer behavior information at the home entertainment system and transmits the tracked information in either real time or on a deferred basis with respect to the current broadcast via a back channel, which is a communication link, so as to allow for the modification of the quality of the broadcast that is provided by the signal source. In one embodiment, the tracked information is transmitted via a back channel to the signal source. In another embodiment, the tracked information is transmitted via a back channel to a clearinghouse system. Furthermore, in one embodiment the information is tracked anonymously such that the identity of the home entertainment system is not disclosed.

In FIG. 2, an illustration is provided as to an example of the interaction between a home entertainment system 90, a signal source 80, and optionally a clearinghouse system 100 in accordance with the present invention. Signal source 80 provides a broadcast 88 to home entertainment system 90 by sending the service across network 110. The broadcast 88 represents data that can be output, recorded, or otherwise utilized at home entertainment system 90. Network 110 can include a cable or optic connection, a terrestrial antenna system, a satellite system, and/or any device or medium capable of transmitting a broadcast to home entertainment system 90.

While the illustrated embodiment provides signal source 80 as a single entity, those familiar with the art of transmitting a broadcast can appreciate that a signal source may comprise a system of entities. For example, a central broadcast facility may broadcast to a variety of local facilities that in turn broadcast to home entertainment systems. As such, the feedback across the back channels can take place between the home entertainment systems and the local facilities and/or between the local facilities and the central broadcast facility. Furthermore, the dynamic restructuring of the broadcast can take place at any level of the broadcast transmission, including at the central facility or at one or more of the local facilities.

Home entertainment system 90 tracks each time broadcast 88 is output, recorded or otherwise utilized at home entertainment system 90, by generating user behavior information to indicate that the broadcast 88 was output, recorded or otherwise utilized at home entertainment system 90. The user behavior information may further indicate how the broadcast 88 was output, recorded or otherwise utilized at home entertainment system 90.

In one embodiment, data that is used to generate the tracked information is made available through the use of a data source. One example of a data source is an electronic program guide ("EPG"). EPGs are widely commercially available, and general concepts relating thereto will be understood by those skilled in the art. An EPG, for example, can be employed that is tailored to include programming information specifically selected for use with the present invention. However, the present invention can be practiced with substantially any existing data source. In a further embodiment, the EPG data is kept current at home entertainment system 90 by updating the EPG data at home entertainment system 90. The updating of EPG 97 can take place in a number of ways. By way of example, EPG 97 could be updated via direct-dial communication over standard telephone lines, a satellite communication system, or over a network, including the Internet. The updating information can come from a variety of sources such as from a clearinghouse system 100, as indicated by EPG data 108, or from a separate source, including the signal source 80.

The amount and type of information available through an EPG is very diverse, yet very specific. The information can include any information related to the broadcast being received such as the provider of the broadcast, the type of broadcast, the date and time that the broadcast is being provided, the origination of the broadcast, and the manner in which the broadcast is being supplied. By way of example, and not limitation, the EPG information may include information specific to one or more programs of the broadcast such as the title of a program, the episode, the director of the program, the performing actors, program ratings, etc. The information may also include information specific to a channel of the broadcast that is tunable at the home entertainment system 90, such as the channel number, the call letters of the station, the network affiliation, the transmission frequency, the origin of transmission, etc. The information furthermore may include other descriptive information specific to the broadcaster or subscriber, such as whether the signal originates from a local station, a network station, a cable station, or a satellite station, the location of the subscriber, the date subscribed, etc.

Therefore, the outputting, recording or otherwise utilization of a broadcast is tracked at home entertainment system 90. The tracking may be initiated upon the occurrence of an event performed by a viewer of home entertainment system 90. In this description and in the claims, the term "event" encompasses an instructional input received by a home entertainment system, whereby video data corresponding to broadcast 88 is output, recorded or otherwise utilized at home entertainment system 90. The input may be entered by the viewer or some other source. The term "event" also extends to other changes in programming displayed on the home entertainment system without viewer input, one example being the beginning of a scheduled program on an already-tuned channel.

Once an event occurs, home entertainment system 90 couples the occurrence of the event with information specific to the program output, recorded, or otherwise utilized. This may include, for example, coupling unique IDs from an EPG to an occurrence of an event. The IDs identify such information as the program viewed and the channel tuned. Thus, a processor 94 at home entertainment system 90 that is coupled with computer-executable instructions represents one example of means for generating user behavior.

Depending on the type and volume of user behavior information that is desired to be tracked, specific data corresponding to the broadcast can be requested remotely. For example, the operator of central clearinghouse 80 to which the user behavior information is to be sent might decide that the desired types of information from the EPG that are to be included in the user behavior information are the Channel ID, the Subscriber ID, the Program ID and Title, the City and State of the Channel, and the Date and Time. Thus for each event, the foregoing information contained in the appropriate data fields of the EPG and information otherwise maintained at the home entertainment system is identified and stored as an instance of user behavior information.

Although the information used to compile the tracked user behavior information can be conveniently retrieved from a signal source as described above, the information can alternatively be retrieved directly from data transmitted on a signal. For instance, data is often encoded in the vertical blanking interval of a television signal. In other situations, an entire channel can be dedicated to transmitting data on a signal. In any of these cases, the encoded data can represent a description of a broadcast. Thus, the invention extends to compiling user behavior information using data encoded in a television signal.

As provided above, the tracked user behavior information generated at home entertainment system 90 is transmitted as feedback across a back channel, as illustrated in FIG. 2 by user behavior information 98. In one embodiment, the tracked information is transmitted in real time to a remote location, such as to the signal source 80 or to a clearinghouse system 100. In a separate embodiment, the tracked user behavior information is stored locally on storage device 96 to create a sequential log of tracked information that is periodically transmitted across a back channel on a deferred basis to the signal source 80 or clearinghouse system 100. Furthermore, when the tracked information is transmitted on a periodic/deferred basis, upon the transmission of the user behavior information or upon a confirmation that user behavior information 98 has been received, processor 94 clears the transmitted user behavior information from storage device 96 and creates a new sequential log of user behavior information.

The tracked user behavior information that is provided as feedback across a back channel provides operators and broadcasters valuable guidance for regulating and optimizing quality of broadcast provided, including the utilization of bandwidth. As provided above, the tracked information may be transmitted directly to a signal source, or alternatively to a clearinghouse system that oversees the gathering of the tracked user behavior information, all of which will be further explained below.

Figure 3:
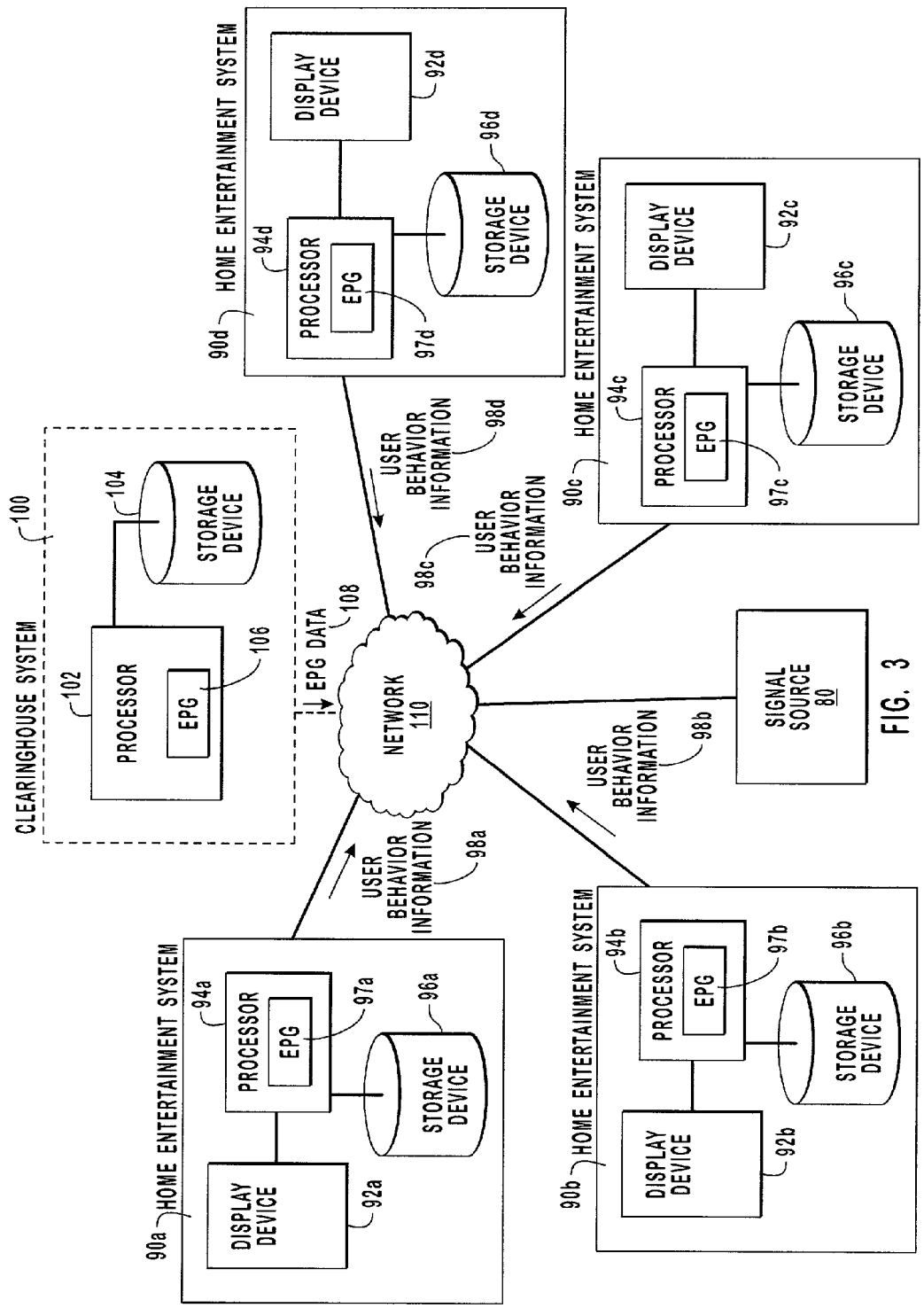
FIG. 3 illustrates the gathering of tracked information from a variety of home entertainment systems via various back channels.

The present invention for providing feedback to regulate the quality of a broadcast may be utilized among a plurality of networked home entertainment systems. With reference to FIG. 3, a networked feedback system is illustrated that demonstrates the transmission of tracked user behavior information between a plurality of home entertainment systems 90 and one or more remote locations via a network 110. The networked feedback system illustrated in FIG. 3 is representative of networks having any number of associated home entertainment systems.

Figure 4:
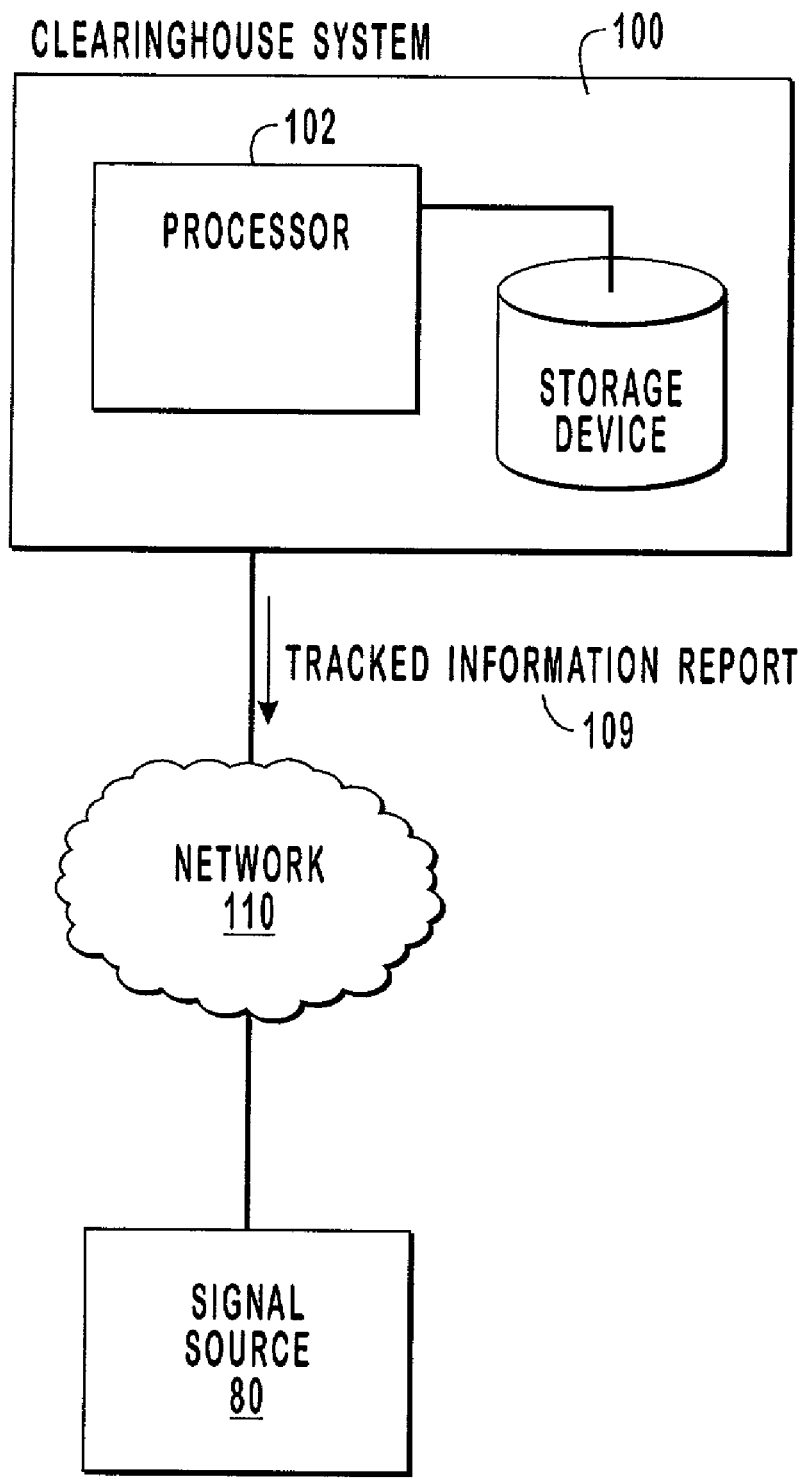
FIG. 4 illustrates an example of a networked system that utilizes a central clearinghouse to gather the tracked information in order to regulate and/or optimize the quality of a broadcast.

As explained previously, a home entertainment system can include a plurality of consumer electronic devices, but for the purposes of illustration each home entertainment system of FIG. 4 includes a display device 92, a processor 94, an EPG 97, and a local storage device 96. A signal carrying a broadcast is transmitted from a signal source 80 that is receivable by the home entertainment systems 90. Processors 94 independently gather and transmit the user behavior information tracked at the corresponding home entertainment systems 90 so as to indicate the video data displayed, recorded or otherwise utilized at the respective home entertainment system 90. While FIG. 3 illustrates each of the home entertainment systems 90 transmitting user behavior information 98 in response to tuning to the broadcast sent out from signal source 80, every home entertainment system does not need to tune to the broadcast and/or transmit user behavior information. In one embodiment, a statistical analysis is performed at the clearinghouse system 100 or at the signal source 80 to determine when a statistically significant number of home entertainment systems have transmitted user behavior information to cause a restructuring of the broadcast, as will be further explained below.

The tracked user behavior information 98 of each home entertainment system 90 is transmitted to one or more locations that are generally remote with respect to the home entertainment systems 90. When the one or more remote locations comprise a clearinghouse system 100, a storage device 104 gathers the tracked information from the myriad of home entertainment systems 90. The tracked information arrives at the one or more remote locations in a format that is usable or close to being usable, because it can include information that identifies and describes programming displayed, rather than merely including a channel number.

With reference to FIG. 4, once tracked information is received at the clearinghouse system 100, a processor 102 processes the tracked information and/or makes the tracked information available to interested entities so as to regulate the quality of the broadcast. Where unreliable or potentially unreliable back channels are employed to transmit the tracked information, the processing of the tracked information includes performing a statistical analysis as to the reliability of the sampling received. The processing of the tracked information can also include an analysis of the data in order to optimize the broadcast. Furthermore, the processing can include generating a profile of the home entertainment systems or users. The profile may include, for example, the programs or channels of the broadcast that are more frequently tuned. Once the tracked information is processed at clearinghouse system 100 the results, illustrated as tracked information report 109, can be provided to signal source 80 to indicate any changes that need to be performed in the video service in order to regulate or optimize the service. Such changes include, for example, modifying bandwidth of the broadcast, changing modulation of the broadcast, changing an encoding scheme of the broadcast, varying parameters of the encoding scheme of the broadcast, redistributing a channel of the broadcast from a first transponder to a second transponder of a satellite television system, interrupting the broadcast by allocating no bandwidth to a channel so as to entirely shut off the channel, reserving a guaranteed amount of bandwidth to the broadcast, etc. Furthermore, the bandwidth may be increased for channels or programs of the broadcast that are more frequently tuned or more likely to be tuned. In one embodiment, the increased allocation of bandwidth occurs at an instant in time before the program that is likely to be tuned is aired.

Figure 5:
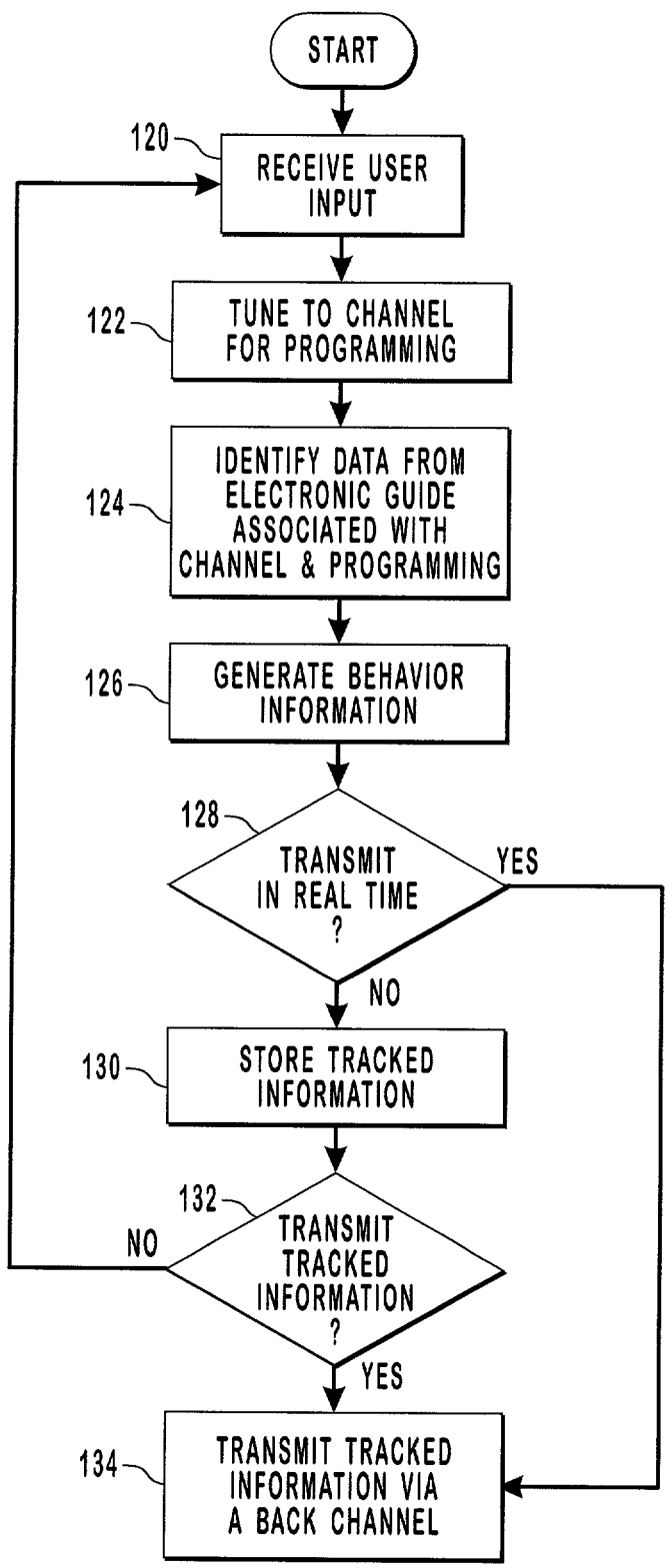
FIG. 5 is a flow chart that provides an exemplary method for tracking information and transmitting the tracked information via a back channel as feedback.

Referring now to FIG. 5, a flowchart is provided that illustrates an exemplary method for tracking user behavior information and transmitting the tracked information via a back channel as feedback. As explained above, and depicted by step 120, the invention is initiated upon the occurrence of an event. By way of example, the event may request the tuning to a channel, whereby step 122 is followed. Upon tuning to the channel, step 124 identifies the information from the EPG stored in memory that is associated with the programming carried on the tuned channel. Step 126 couples the event with the information identified to generate user behavior information. Decision block 128 determines whether or not the user behavior information is to be transmitted via a back channel in real time. If it is to be transmitted via a back channel in real time, execution proceeds to step 134 for the transmission of the tracked information via a back channel.

Alternatively, if it is determined at decision block 128 that the tracked information is not to be sent in real time, execution proceeds to step 130 for the storing of the tracked information on a storage device. After the user behavior information is stored, decision block 132 determines whether or not to transmit the tracked information to a location that is remote with respect to the home entertainment system. If it is not time to transmit the tracked information, the process is continued upon the occurrence of a subsequent event. If it is time to transmit the user behavior information, then the act of transmitting the tracked information via a back channel takes place during step 134.

The invention has been described above primarily in the context of compiling full user behavior information at the home entertainment systems, thereby minimizing the processing requirements of a central clearinghouse. However, in other embodiments, much of the processing is shifted to the central clearinghouse or another entity so as to reduce the data processing, storage, and transmission requirements of the home entertainment systems. For example, the user behavior information that is generated at the home entertainment system can be limited to as little as a unique ID associated with a channel and a unique ID associated with a program of the broadcast retrieved from a data source. In this situation, the clearinghouse provides all of the other desired descriptive information from a copy of the electronic program guide, for example, to generate and store a comprehensive record of user behavior information. Thus, data generation and processing can be distributed among the home entertainment systems and the clearinghouse or other entities as desired according to the invention.

Modifying Quality of Service

As provided above, the present invention utilizes a back channel, which is a communication link, as a feedback system to regulate the quality of a broadcast transmitted. As such, embodiments of the present invention take advantage of the infrastructure currently available by varying, modifying, optimizing and/or regulating the quality of the broadcast that is provided across that infrastructure.

When feedback is provided in accordance with the present invention, the signal source can restructure the broadcast in real time or on a deferred basis with respect to the broadcast. In one embodiment, the feedback is sent via a back channel to a clearinghouse system, which gathers the feedback from various home entertainment systems and transmits the results of the feedback to the signal source on a store-and-forward basis. In a further embodiment, the clearinghouse system performs a statistical analysis on the feedback prior to forwarding the results to the signal source. The statistical analysis determines when a significant number of home entertainment systems have transmitted feedback in order to forward the results of the feedback to a signal source to modify the broadcast.

The feedback provides valuable guidance to operators and broadcasters of a broadcast in order to regulate and optimize the bandwidth and quality of the broadcast. The modifications made to the video service can be performed at the signal source or at any of the nodes of the network. For example, the broadcasting of channels of the broadcast spectrum can be restructured to better utilize available bandwidth by allocating bandwidth according to the actual viewing audience of each channel. Alternatively, or additionally, channels can be restructured so as to allocate additional bandwidth to channels that enable viewer interaction along with the broadcast. The feedback may also inform the operators and broadcasters as to when a disruption of the broadcast can be most efficiently made on a channel so that the effect of the disruption is minimized. Also, the feedback allows for such other modifications as changing the modulation of the broadcast, changing an encoding scheme of the broadcast, varying parameters of the encoding scheme of the broadcast, etc.

Figure 6:
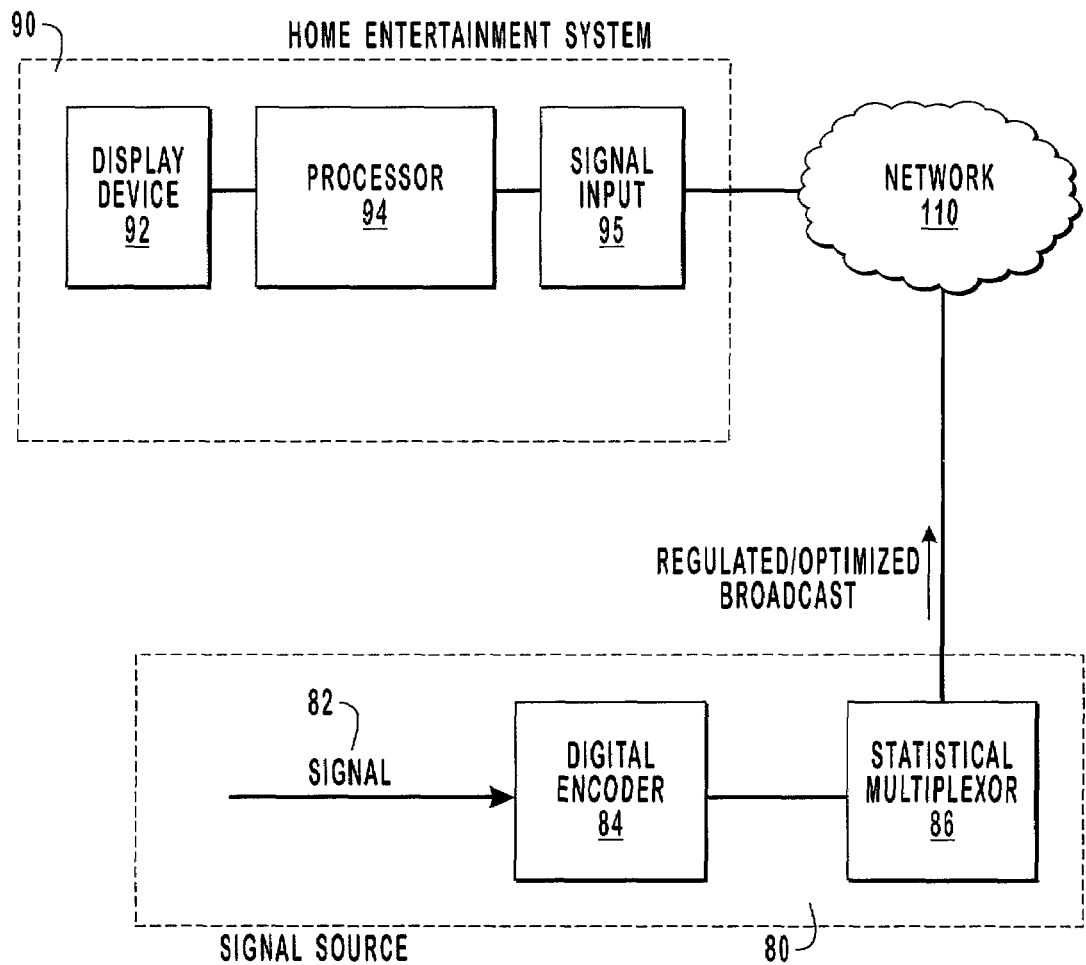
FIG. 6 illustrates a regulation/optimization of a broadcast provided in response to the tracked information received via a back channel.

One example of dynamically restructuring channels of a video service spectrum includes redistributing satellite channels of a satellite television service spectrum to take full advantage of the transponders available in the satellite television system. With reference to FIG. 6, a signal source 80 is illustrated that provides a broadcast across a medium, illustrated as network 110, to a home entertainment system 90. At the signal source 80, a signal 82 corresponding to the broadcast may be passed through a digital encoder 84 if the signal is an analog signal. The signal may then be passed through a statistical multiplexor 86, which is commonly referred to as a step box. A plurality of channels within a spectrum are brought into a step box and the channels are assigned to individual transponders of a satellite system. Once the channels are assigned to individual transponders, the step box produces a single bit stream that is transmitted out. The signal is received by a signal input 95 of a home entertainment system 90 and a program of the broadcast can be output, such as by being displayed on a display device 92. When the program is displayed, processor 94 generates tracked behavior information that is sent as feedback across a communication link, such as a back channel In response to the feedback the quality of the broadcast is increased by, for example, having a statistical multiplexer 86 reassign one or more of the channels of the spectrum to the transponders in order to maximize the available bandwidth. Therefore, more bandwidth can be assigned to channels of the spectrum that have large viewer participation, that enable viewer interaction along with the broadcast of video data, etc., in order to increase the quality of the broadcast provided by signal source 80. While the foregoing example utilized an embodiment of the present invention to maximize the bandwidth available in a satellite television service, embodiments of the present invention embrace the utilization of a communication link, such as a back channel, to maximize the available bandwidth of a plethora of different kinds of broadcasting services, including multicasting, an MPEG data stream, and any other service that transmits or communicates information corresponding to data that is viewable, recordable or otherwise usable at a home entertainment system. Maximizing the bandwidth available for the broadcast also results in an improved quality of the broadcast.

Thus, as provided above, the present invention relates to systems and methods for utilizing a back channel as a feedback system to regulate the quality of a broadcast. More specifically, the present invention is directed to tracking user behavior information at home entertainment systems, transmitting the tracked information as feedback across a back channel, and modifying the quality of the broadcast as a result of the feedback. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a system where a broadcast is output across a communications medium to individual home entertainment systems, the broadcast including a plurality of channels of viewable moving image data, a method for optimizing the quality of the broadcast by dynamically restructuring the broadcasting of the plurality of channels based on feedback from at least some of the home entertainment systems, the method comprising the steps for:

upon the occurrence of an event at a first home entertainment system, initiating usage tracking for a selected type of viewable moving image data usage for viewable moving image data of a selected channel, the selected type of viewable moving image data usage being selected from among a plurality of different types of viewable moving image data usage that can be tracked each time one of the plurality of different types of viewable moving image data usage are utilized at the first home entertainment system;

in response to the event, tracking a utilization of the selected type of viewable moving image data usage, from among the plurality of different types of viewable moving image data usage, for the moving image data at the first home entertainment system by generating user behavior information to indicate that the selected type of viewable moving image data usage is utilized;

coupling the event with the generated user behavior information for the first home entertainment system;

combining the event and the generated user behavior information from the first home entertainment system with events and corresponding generated user behavior information from other home entertainment systems, the other home entertainment systems also utilizing a type of viewable moving image data usage selected from among the plurality of different types of viewable moving image data usage for the selected channel, wherein the other home entertainment centers also track each time one of the plurality of different types of viewable moving image data usage is utilized in response to a corresponding event; and dynamically restructuring the broadcast of at least the selected channel, by at least restructuring the viewable moving image data of the selected channel, based on the different types of viewable moving image data usage indicated in the combined events and generated user behavior information so as to optimize the quality of the broadcast, the restructuring increasing the quality of the broadcast by;

reassigning the channel from a first transponder of a satellite television system to a second transponder of the satellite television system, the second transponder having a greater detected amount of available bandwidth, in response to the tracked utilization and generated user behavior such that available bandwidth on the second transponder is allocated to the channel with a larger perceived user participation; and dynamically increasing the bandwidth allocated to the selected channel, such that the signal strength of the selected channel is increased proportional to the actual detected viewing audience of the selected channel.

2. A method as recited in claim 1, wherein the combined user behavior information is anonymous such that the identities of the first home entertainment system and the other home entertainment systems are not disclosed.

3. A method as recited in claim 1, wherein said step for dynamically restructuring a broadcast is performed automatically.

4. A method as recited in claim 1, wherein said step for dynamically restructuring comprises at least one of:
   modifying bandwidth of the broadcast;
   interrupting the broadcast by allocating no bandwidth to the channel so as to entirely shut off the channel; and
   reserving a guaranteed amount of bandwidth for the broadcast.

5. A method as recited in claim 1, further comprising the step for transmitting the coupled event and generated user behavior information for the first home entertainment system as feedback across a back channel from the first home entertainment system to a signal source, wherein the coupled event and generated user behavior information is transmitted in one of real time and a deferred basis with respect to the broadcast of the channel.

6. A method as recited in claim 5, wherein a statistical analysis is performed at the signal source to determine when a statistically significant number of home entertainment systems have transmitted generated user behavior information.

7. A method as recited in claim 1, further comprising the step for transmitting the coupled event and generated user behavior information as feedback across a back channel from the first home entertainment system to a clearinghouse system, wherein the generated user information is transmitted in at least one of (i) real time with respect to the broadcast of the channel and (ii) on a deferred basis with respect to the broadcast of the channel.

8. A method as recited in claim 7, wherein the clearinghouse system performs said step for combining.

9. A method as recited in claim 8, wherein a statistical analysis is performed at the clearinghouse system to determine when a statistically significant number of home entertainment systems have transmitted generated user behavior information.

10. A method as recited in claim 9, wherein the clearinghouse system processes the combined events and generated user behavior information and forwards the results to a signal source.

11. A method as recited in claim 10, wherein the processing performed at the clearinghouse system comprises associating the combined events and generated user behavior information with data from a data source.

12. A method as recited in claim 11, wherein the data source comprises an electronic programming guide that provides data as to at least one of a program and an advertisement.

13. A method as recited in claim 10, wherein the processing performed at the clearinghouse system comprises generating a profile of at least one of the home entertainment systems and the users.

14. A method as recited in claim 13, wherein the profile includes the programs of the broadcast to which the home entertainment systems are more frequently tuned compared to other programs of the broadcast.

15. A method as recited in claim 14, further comprising allocating increased bandwidth to the programs more frequently tuned.

16. A method as recited in claim 15, wherein the bandwidth is increased at an instant in time prior to the airing of the programs more frequently tuned.

17. A method as recited in claim 14, further comprising allocating increased bandwidth to channels of the broadcast to which the home entertainment systems are more frequently tuned.

18. In a system where a broadcast is output across a communications medium and is received by one or more individual home entertainment systems, the broadcast including a plurality of channels of viewable moving image data, a method for restructuring the broadcast based on feedback transmitted from the one or more home entertainment systems across one or more potentially unreliable back channels to a clearinghouse system, the method comprising the acts of:

receiving at the clearinghouse system an event and coupled user behavior information across a first communication link from a first home entertainment system, wherein the event was used to initiate tracking of a selected type viewable moving image data usage for viewable moving image data of a selected channel, the selected type of viewable moving image data usage at the first home entertainment system being selected from among a plurality of different types of viewable moving image data usage that can be tracked each time one of the plurality of different types of viewable moving image data usage is utilized at the first home entertainment system;

receiving at the clearinghouse system other events and coupled user behavior information across other communication links from other home entertainment systems, wherein the events were used to initiate tracking of selected types of viewable moving image data usage for the viewable moving image data at the other home entertainment systems, the selected types of viewable moving image data usage at the other home entertainment systems being selected from among the plurality of different types of viewable moving image data usage that can be tracked;

combining at the clearinghouse system the event and coupled user behavior information from the first home entertainment system with the events and coupled user behavior information from the other home entertainment systems, the combined events and coupled user behavior information indicating the different types of viewable moving image data usage being utilized in the system for the viewable moving image data; and automatically restructuring the broadcast of at least the selected channel, by at least restructuring the viewable moving image data, based on analyzing the combined events and coupled user behavior information indicating the different types of viewable moving image data usage utilized in the system for the viewable moving image data, the restructuring increasing the quality of the broadcast by;

reassigning the channel from a first transponder of a satellite television system to a second transponder of the satellite television system, the second transponder having a greater detected amount of available bandwidth, in response to the tracked utilization and generated user behavior such that available bandwidth on the second transponder is allocated to the channel with a larger perceived user participation; and dynamically increasing the bandwidth allocated to the selected channel, such that the signal strength of the selected channel is increased proportional to the actual detected viewing audience of the selected channel.

19. A method as recited in claim 18, wherein the first communication link and the other communication links are each back channels.

20. A method as recited in claim 19, further comprising the act of statistically determining at the clearinghouse system the reliability of the combined user behavior information, wherein said act of automatically restructuring a broadcast is based on the statistical determination performed at the clearinghouse system.

21. A method as recited in claim 20, wherein the statistical determination performed at the clearinghouse system comprises determining when a statistically significant amount of user behavior information has been received to cause the broadcast to be automatically restructured.

22. A method as recited in claim 19, wherein said act of automatically restructuring a broadcast comprises allocating varying amounts of bandwidth of an MPEG data stream to the channel.

23. In a system where a broadcast is provided from a signal source across a communications medium and is received by one or more individual home entertainment systems, the broadcast including a plurality of channels having viewable moving image data, a method for optimizing the bandwidth by restructuring the broadcasting of one or more channels within the broadcast based on feedback transmitted from the one or more home entertainment systems to the signal source across one or more back channels, the method comprising the acts of:

transmitting a broadcast from a signal source to one or more home entertainment systems;

receiving at the signal source an event and coupled user behavior information across a first back channel from a first home entertainment system, wherein the event was used to initiate tracking of viewable moving image data usage of viewable moving image data for a selected channel, the selected type of viewable moving image data usage at the first home entertainment system being selected from among a plurality of different types of viewable moving image data usage that can be tracked each time one of the plurality of different types of viewable moving image data usage is utilized at the first home entertainment system;

receiving at the signal source other events and coupled user behavior information across other back channels from other home entertainment systems, wherein the events were used to initiate tracking of selected types of viewable moving image data usage at the other home entertainment systems, the selected types of viewable moving image data usage at the other home entertainment systems being selected from among the plurality of different types of viewable moving image data usage that can be tracked;

combining the event and coupled user behavior information from the first home entertainment system with the events and coupled user behavior information from the other home entertainment systems, the combined events and coupled user behavior information indicating the different types of viewable moving image data usage being utilized in the system for the viewable moving image data; and automatically restructuring a broadcast of the selected channel, by at least restructuring the viewable moving image data, based on analyzing the combined events and coupled user behavior information indicating the different types of viewable moving image data usage utilized in the system for the viewable moving image data, the restructuring increasing the quality of the broadcast by:

reassigning the channel from a first transponder of a satellite television system to a second transponder of the satellite television system, the second transponder having a greater detected amount of available bandwidth, in response to the tracked utilization and generated user behavior such that available bandwidth on the second transponder is allocated to the channel with a larger perceived user participation; and dynamically increasing the bandwidth allocated to the selected channel, such that the signal strength of the selected channel is increased proportional to the actual detected viewing audience of the selected channel.

24. A method as recited in claim 23, wherein the user behavior information is received in real time across the first communication link with respect to a program broadcast on the selected channel.

25. A method as recited in claim 23, wherein the user behavior information is received on a deferred basis across the first communication link with respect to a program broadcast on the selected channel.

26. In a broadcast system, a computer program product for implementing a method for restructuring a broadcast based on feedback, wherein the broadcast originates from a signal source and is receivable by one or more of a plurality of home entertainment systems, the broadcast including a plurality of channels of viewable moving image data, the computer program product comprising:

a computer readable medium carrying computer program code means utilized to implement the method, wherein the computer program code means comprises executable code for implementing the acts of:

receiving at a clearinghouse system an event and coupled user behavior information across a first communication link from a first home entertainment system, wherein the event was used to initiate tracking of a selected type viewable moving image data usage for viewable moving image data of a selected channel, the selected type of viewable moving image data usage at the first home entertainment system being selected from among a plurality of different types of viewable moving image data usage that can be tracked each time one of the plurality of different types of viewable moving image data usage is utilized at the first home entertainment system receiving at the clearinghouse system other events and coupled user behavior information across other communication links from other home entertainment systems, the events were used to initiate tracking of selected types of viewable moveable image data usage at the other home entertainment systems, the selected types of viewable moving image data usage at the other home entertainment systems being selected from among the plurality of different types of viewable moving image data usage that can be tracked;

combining the event and coupled user behavior information from the first home entertainment system with the events and coupled user behavior information from the other home entertainment systems, the combined events and coupled user behavior information indicating the different types of viewable moving image data usage being utilized for the viewable moving image data in the broadcast system; and automatically restructuring the broadcast of the selected channel, by at least restructuring the viewable moving image data, based on analyzing the combined events and coupled user behavior information indicating the different types of viewable moving image data usage utilized in the system for the viewable moving image data, the restructuring increasing the quality of the broadcast by;

reassigning the channel from a first transponder of a satellite television system to a second transponder of the satellite television system, the second transponder having a greater detected amount of available bandwidth, in response to the tracked utilization and generated user behavior such that available bandwidth on the second transponder is allocated to the channel with a larger perceived user participation; and dynamically increasing the bandwidth allocated to the selected channel, such that the signal strength of the selected channel is increased proportional to the actual detected viewing audience of the selected channel.

27. A computer program product as recited in claim 26, wherein said first communication link and said other communication links are each back channels.

28. A computer program product as recited in claim 27, wherein the user behavior information is received in real time with respect to a program broadcast on the selected channel.

29. A computer program product as recited in claim 27, wherein the user behavior information is received on a deferred basis with respect to a program broadcast on the selected channel.

30. The method as recited in claim 1, wherein the step for initiating usage tracking for a selected type of viewable moving image data usage for viewable moving image data of a selected channel comprises an a step for initiating usage tracking for selected type of viewable moving image data usage selected from among outputting the viewable moving image data and recording the viewable moving image.

31. The method as recited in claim 30, wherein the step for initiating usage tracking for a selected type of viewable moving image data usage selected from among viewing the viewable moving image data and recording the viewable moving image comprises a step for initiating usage tracking for recording the viewable moving image data.

32. The method as recited in claim 1, wherein the step for tracking utilization of a selected type of viewable moving image data usage for the viewable moving image data comprises a step for tracking utilization of recording the viewable moving image data.

33. The method as recited in claim 1, wherein the step for combining the event and the generated user behavior information from the first home entertainment system with events and corresponding generated user behavior information from other home entertainment systems comprises an step for combining a first event and generated user behavior information indicating the viewable moving image data is being recording with a second event and generated user behavior information indicating the viewable moving image data is being output.

34. The method as recited in claim 1, wherein the step for dynamically restructuring the broadcast of at least the selected channel comprises a strep for restructuring the broadcast based on the combined events and generated user behavior information indicating that at least one home entertainment system is recording the viewable moving image data and at least one home entertainment system is outputting the viewable moving image data.

35. The method as recited in claim 1, wherein the step for initiating usage tracking for a selected type of viewable moving image data usage for viewable moving image data of a selected channel comprises an a step for initiating usage tracking for a selected type of viewable moving image data usage that indicates how the viewable moving image data is being used.

36. The method as recited in claim 6, further comprising delaying increasing the bandwidth allocated to the selected channel until a statistically significant number of home entertainment systems have transmitted generated user behavior information.

37. The method of claim 1, wherein the viewable moving image data broadcast in the selected channel is broadcast in analog form.

38. The method of claim 1, wherein the tracked moving image data usage includes a description of a program being broadcast on the selected channel.

39. The method of claim 1, wherein the increased bandwidth for the selected channel enables user interaction along with the broadcast of the viewable moving image data.

40. In a system where a broadcast is output across a communications medium to individual home entertainment systems, the broadcast including a plurality of channels of viewable moving image data, a method for minimizing disruption of a broadcast based on feedback from at least some of the home entertainment systems, the method comprising the steps for:
  upon the occurrence of an event at a first home entertainment system, initiating usage tracking for a selected type of viewable moving image data usage for viewable moving image data of a selected channel, the selected type of viewable moving image data usage being selected from among a plurality of different types of viewable moving image data usage that can be tracked each time one of the plurality of different types of viewable moving image data usage are utilized at the first home entertainment system;
  in response to the event, tracking a utilization of the selected type of viewable moving image data usage, from among the plurality of different types of viewable moving image data usage, for the moving image data at the first home entertainment system by generating user behavior information to indicate that the selected type of viewable moving image data usage is utilized;
  coupling the event with the generated user behavior information for the first home entertainment system;
  combining the event and the generated user behavior information from the first home entertainment system with events and corresponding generated user behavior information from other home entertainment systems, the other home entertainment systems also utilizing a type of viewable moving image data usage selected from among the plurality of different types of viewable moving image data usage for the selected channel, wherein the other home entertainment centers also track each time one of the plurality of different types of viewable moving image data usage is utilized in response to a corresponding event;
  based on the combined event and generated user behavior information, determining an optimal time to disrupt programming on the selected channel such that a minimal number of users are affected by the disruption; and
  shutting down the viewable moving image data broadcast on the selected channel during the determined optimal time.

* * * * *